(12) United States Patent
Trautner et al.

(10) Patent No.: US 11,897,350 B2
(45) Date of Patent: Feb. 13, 2024

(54) MATERIALS HANDLING VEHICLE CHARGING SYSTEM COMPRISING A FLOOR-MOUNTED CHARGING PLATE

(71) Applicant: Crown Equipment Corporation, New Bremen, OH (US)

(72) Inventors: Florian Trautner, Munich (DE); Robert Shearrer, Pullach (DE); Stefan Hannemann, Munich (DE); Kevin Gilliland, Coldwater, OH (US); Adam Wietholter, Marysville, OH (US)

(73) Assignee: Crown Equipment Corporation, New Bremen, OH (US)

( * ) Notice: Subject to any disclaimer, the term of this patent is extended or adjusted under 35 U.S.C. 154(b) by 269 days.

(21) Appl. No.: 17/363,953

(22) Filed: Jun. 30, 2021

(65) Prior Publication Data
US 2022/0001758 A1    Jan. 6, 2022

Related U.S. Application Data

(60) Provisional application No. 63/047,445, filed on Jul. 2, 2020.

(51) Int. Cl.
*B60L 53/16* (2019.01)
*B60L 53/36* (2019.01)

(52) U.S. Cl.
CPC .............. *B60L 53/16* (2019.02); *B60L 53/36* (2019.02); *B60L 2200/44* (2013.01)

(58) Field of Classification Search
CPC ....... B60L 53/16; B60L 53/36; B60L 2200/44
(Continued)

(56) References Cited

U.S. PATENT DOCUMENTS 9,780,546 B2    10/2017    Carbone et al.
9,884,751 B2     2/2018    Jaipaul
(Continued)

FOREIGN PATENT DOCUMENTS

CN    203438872 U    2/2014
CN    206481085 U    9/2017
(Continued)

OTHER PUBLICATIONS

AGVs: Bridging the gap in automation, http://cdn.modexshow.com/seminars/assets-2016/1010.pdf (2016) 36 pgs.
(Continued)

*Primary Examiner* — Brian Ngo
(74) *Attorney, Agent, or Firm* — DINSMORE & SHOHL LLP

(57) ABSTRACT

A materials handling vehicle including a vehicle-side charging contact assembly coupled to a battery, a steerable drive wheel defining a drive wheel track width W, and a pair of load wheels defining a load wheel gap G between the pair of load wheels that is larger than the drive wheel track width W. A charging station includes a pair of floor-side charging contacts configured to transfer charging current to the vehicle-side charging contact assembly. The pair of floor-side charging contacts define an inner contact spacing S1 that is larger than the drive wheel track width W, and an outer contact spacing S2 that is larger than the inner contact spacing S1 and smaller than the load wheel gap G to permit passage of the steerable drive wheel between the floor-side charging contacts, followed by passage of the pair of load wheels outside of the floor-side charging contacts.

20 Claims, 7 Drawing Sheets

(58) Field of Classification Search
USPC .......................................................... 320/109
See application file for complete search history.

(56) References Cited

U.S. PATENT DOCUMENTS

| | | | |
|---|---|---|---|
| 10,303,171 B1 | 5/2019 | Brady et al. | |
| 10,383,499 B2 | 8/2019 | Fox et al. | |
| 10,566,734 B1 | 2/2020 | Pabouctsidis | |
| 10,940,873 B1* | 3/2021 | Summers | B61D 3/18 |
| 2011/0106352 A1* | 5/2011 | Scheuerman | G05D 1/0265 |
| | | | 701/22 |
| 2012/0203410 A1 | 8/2012 | Wechlin et al. | |
| 2012/0282065 A1 | 11/2012 | Virk | |
| 2017/0136892 A1* | 5/2017 | Ricci | H02J 50/10 |
| 2017/0140349 A1* | 5/2017 | Ricci | B60L 53/63 |
| 2019/0263278 A1 | 8/2019 | Stockinger et al. | |
| 2019/0389497 A1* | 12/2019 | Golpe | B60M 1/36 |
| 2020/0073402 A1* | 3/2020 | Brucker | G05D 1/0278 |
| 2020/0101856 A1* | 4/2020 | Klausner | B60L 53/36 |
| 2021/0086641 A1* | 3/2021 | Fuhlbrigge | B60L 53/14 |
| 2021/0114471 A1* | 4/2021 | Ye | B60L 53/12 |
| 2021/0119486 A1* | 4/2021 | Kanno | H02J 50/05 |
| 2022/0009567 A1* | 1/2022 | Roy | B62D 55/065 |
| 2022/0258630 A1* | 8/2022 | Paterson | B60L 53/18 |
| 2023/0182598 A1* | 6/2023 | Chase | B60L 53/36 |
| | | | 320/108 |

FOREIGN PATENT DOCUMENTS

| | | |
|---|---|---|
| CN | 206589714 U | 10/2017 |
| CN | 107738592 A | 2/2018 |
| CN | 108081980 A | 5/2018 |
| CN | 108116266 A | 6/2018 |
| CN | 108340797 A | 7/2018 |
| CN | 108556674 A | 9/2018 |
| CN | 208664983 U | 3/2019 |
| CN | 109572460 A | 4/2019 |
| CN | 110253476 A | 9/2019 |
| CN | 106602660 B | 12/2019 |
| CN | 110556656 A | 12/2019 |
| DE | 102016121229 A1 | 5/2018 |
| JP | 2009038858 A | 2/2009 |
| JP | 2019146371 A | 8/2019 |
| KR | 101583054 B1 | 1/2016 |
| KR | 20170128091 A | 11/2017 |
| WO | 2017148436 A1 | 9/2017 |

OTHER PUBLICATIONS

Charging contacts (BLS/BLK, SLS), https://www.vahleinc.com/charging-contact-bls-blk-sls.html#tabbed-content-wrap (2020) 8 pgs.
Charging contacts for AGV, https://www.mhe-demag.com/charging-contacts-for-agv (2020) 3 pgs.
Robopads charge system, https://www.roboteq.com/index.php/roboteq-products-and-services/brushed-dc-motor-controllers/robopads-charge-system (2020) 12 pgs.
International Search Report and Written Opinion dated Oct. 27, 2021 in related International Application No. PCT/US2021/040092.

* cited by examiner

MATERIALS HANDLING VEHICLE CHARGING SYSTEM COMPRISING A FLOOR-MOUNTED CHARGING PLATE

CROSS-REFERENCE TO RELATED APPLICATIONS

This application claims the benefit of U.S. Provisional Application Ser. No. 63/047,445, filed Jul. 2, 2021.

BACKGROUND

Materials handling vehicles are utilized to move materials into, out of, and throughout a warehouse environment. For example, and not by way of limitation, materials handling vehicles include tuggers, forklift trucks, hand and motor driven pallet trucks, and other types of materials handling vehicles. Materials handling vehicles can be configured as automated guided vehicles or as vehicles that manually navigate through a warehouse environment. In order to facilitate partially or fully automated navigation, the vehicle may be adapted for localization within the environment. That is, the materials handling vehicle can be adapted with sensors and processors for localization, i.e., for determining the location and, optionally, the pose of the vehicle within the environment. The sensors can be configured to detect objects in the environment and the localization can be dependent upon features extracted from such detected objects. Systems of this nature are described in, for example, US PG Pub. Nos. 2016/0090281 and 2016/0011595.

BRIEF SUMMARY

According to the subject matter of the present disclosure, a materials handling vehicle charging system includes a materials handling vehicle and a charging station. The materials handling vehicle includes a materials handling mechanism, a battery, a drive mechanism powered by the battery, a vehicle-side charging contact assembly defining a vehicle-side contact profile, vehicle-side charging circuitry coupling the vehicle-side charging contact assembly to the battery, a central drive line extending between a leading end and a trailing end of the materials handling vehicle, a steerable drive wheel motively coupled to the drive mechanism, and a pair of load wheels positioned on opposite sides of the central drive line. The steerable drive wheel is aligned with the central drive line and defines a drive wheel track width W. The pair of load wheels are positioned on opposite sides of the central drive line and define a load wheel gap G between the pair of load heels that is larger than the drive wheel track width W. The charging station includes a floor-mounted charging plate assembly, a battery charger, and floor-side charging circuitry coupling the floor-mounted charging plate assembly to the battery charger. The floor-mounted charging plate assembly includes a pair of floor-side charging contacts defining a floor-side contact profile that complements the vehicle-side contact profile of the vehicle-side charging contact assembly to enable direct contact transfer of charging current from the floor-side charging contacts to the vehicle-side charging contact assembly. The pair of floor-side charging contacts define an inner contact spacing S1 that is larger than the drive wheel track width W, and an outer contact spacing S2 that is larger than the inner contact spacing S1 and smaller than the load wheel gap G to permit passage of the steerable drive wheel between the pair of floor-side charging contacts, followed by passage of the pair of load wheels outside of the pair of floor-side charging contacts, with vehicle movement along the central drive line.

In accordance with one embodiment of the present disclosure, a materials handling vehicle charging system includes a materials handling vehicle and a charging station. The materials handling vehicle includes a materials handling mechanism, a battery, a drive mechanism powered by the battery, a vehicle-side charging contact assembly defining a vehicle-side contact profile, and vehicle-side charging circuitry coupling the vehicle-side charging contacts to the battery. The charging station comprises a floor-mounted charging plate assembly, a battery charger, and floor-side charging circuitry coupling the floor-mounted charging plate assembly to the battery charger. The floor-mounted charging plate assembly includes a mounting platform, a multi-directional charging plate mounted to the mounting platform, and a pair of floor-side charging contacts carried by the multi-directional charging plate. The floor-side charging contacts define a floor-side contact profile that complements the vehicle-side contact profile of the vehicle-side charging contact assembly to enable direct contact transfer of charging current from the floor-side charging contacts to the vehicle-side charging contact assembly. The multi-directional charging plate includes a charging plate footprint that is rotationally symmetric at a plurality of mounting positions about a rotational mounting axis orthogonal to a mounting plane defined by the mounting platform.

In accordance with another embodiment of the present disclosure, a materials handling vehicle charging station including includes a floor-mounted charging plate assembly, a battery charger, and vehicle-side charging circuitry coupling the floor-mounted charging plate assembly to the battery charger. The floor-mounted charging plate assembly includes a pair of floor-side charging contacts defining a floor-side contact profile that is configured to complement a vehicle-side contact profile of a target materials handling vehicle, to enable direct contact transfer of charging current from the floor-side charging contacts to the vehicle-side charging contact assembly. The pair of floor-side charging contacts define an inner contact spacing S1 that is larger than a drive wheel track width W of the target materials handling vehicle, and an outer contact spacing S2 that is larger than the inner contact spacing S1 and smaller than a load wheel gap G of the target materials handling vehicle, to permit passage of a steerable drive wheel of the target materials handling vehicle between the pair of floor-side charging contacts, followed by passage of a pair of load wheels of the target materials handling vehicle outside of the pair of floor-side charging contacts.

In accordance with a further embodiment of the present disclosure, a materials handling vehicle charging station includes a floor-mounted charging plate assembly, a battery charger, and vehicle-side charging circuitry coupling the floor-mounted charging plate assembly to the battery charger. The floor-mounted charging plate assembly includes a pair of floor-side charging contacts defining a floor-side contact profile that is configured to complement a vehicle-side contact profile of a target materials handling vehicle, to enable direct contact transfer of charging current from the floor-side charging contacts to the vehicle-side charging contact assembly. The floor-mounted charging plate assembly includes a mounting platform and a multi-directional charging plate mounted to the mounting platform. The multi-directional charging plate carries the floor-side charging contacts and includes a charging plate footprint that is rotationally symmetric at a plurality of mounting positions about a rotational mounting axis orthogonal to a mounting plane defined by the mounting platform.

Although the concepts of the present disclosure are described herein with primary reference to a tugger-type materials handling vehicle, the concepts herein will enjoy applicability to a variety of different types of battery-powered materials handling vehicles.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
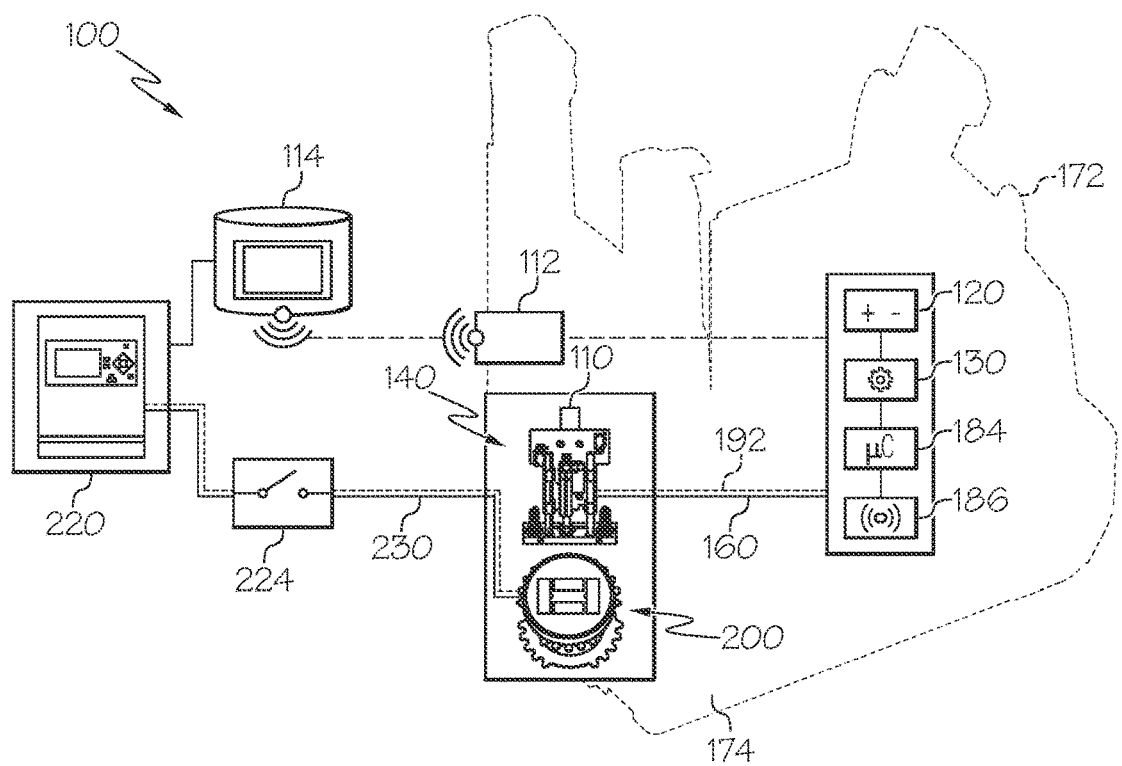
FIG. 1 schematically depicts a materials handling vehicle charging system including a materials handling vehicle and a charging station, according to one or more embodiments shown and described herein.

Referring initially to FIGS. 1-4, a materials handling vehicle charging system is illustrated comprising a materials handling vehicle 100 and a charging station 200.

The materials handling vehicle 100 may include a materials handling mechanism 110, a battery 120, a drive mechanism 130 powered by the battery 120, a vehicle-side charging contact assembly 140 defining a vehicle-side contact profile 150, vehicle-side charging circuitry 160 coupling the vehicle-side charging contact assembly 140 to the battery 120, a central drive line 170 extending between a leading end 172 and a trailing end 174 of the materials handling vehicle 100, a steerable drive wheel 180 motively coupled to the drive mechanism 130, a pair of load wheels 190 positioned on opposite sides of the central drive line 170, and a charging control unit 184. The materials handling mechanism 110 is merely illustrated schematically in FIG. 1, but may be provided in a variety of forms, depending primarily on the vehicle type. For example, where the materials handling vehicle 100 is a tugger, the materials handling mechanism 110 may be provided as a hitch, hook, latch, etc. Where the materials handling vehicle 100 is a forklift truck or a hand or motor-driven pallet truck, the materials handling mechanism 110 may be provided as a pair of materials handling forks.

The materials handling vehicle 100 may be a tugger, with a materials handling mechanism 110 in the form of a hitch or other towing assembly configured to pull a load from the trailing end 174 of the materials handling vehicle 100. However, the materials handling vehicle 100 may be any vehicle including a materials handling mechanism capable of handling materials, such as, for example, a forklift truck, a hand and motor driven pallet truck, and other types of materials handling vehicles.

Figure 4:
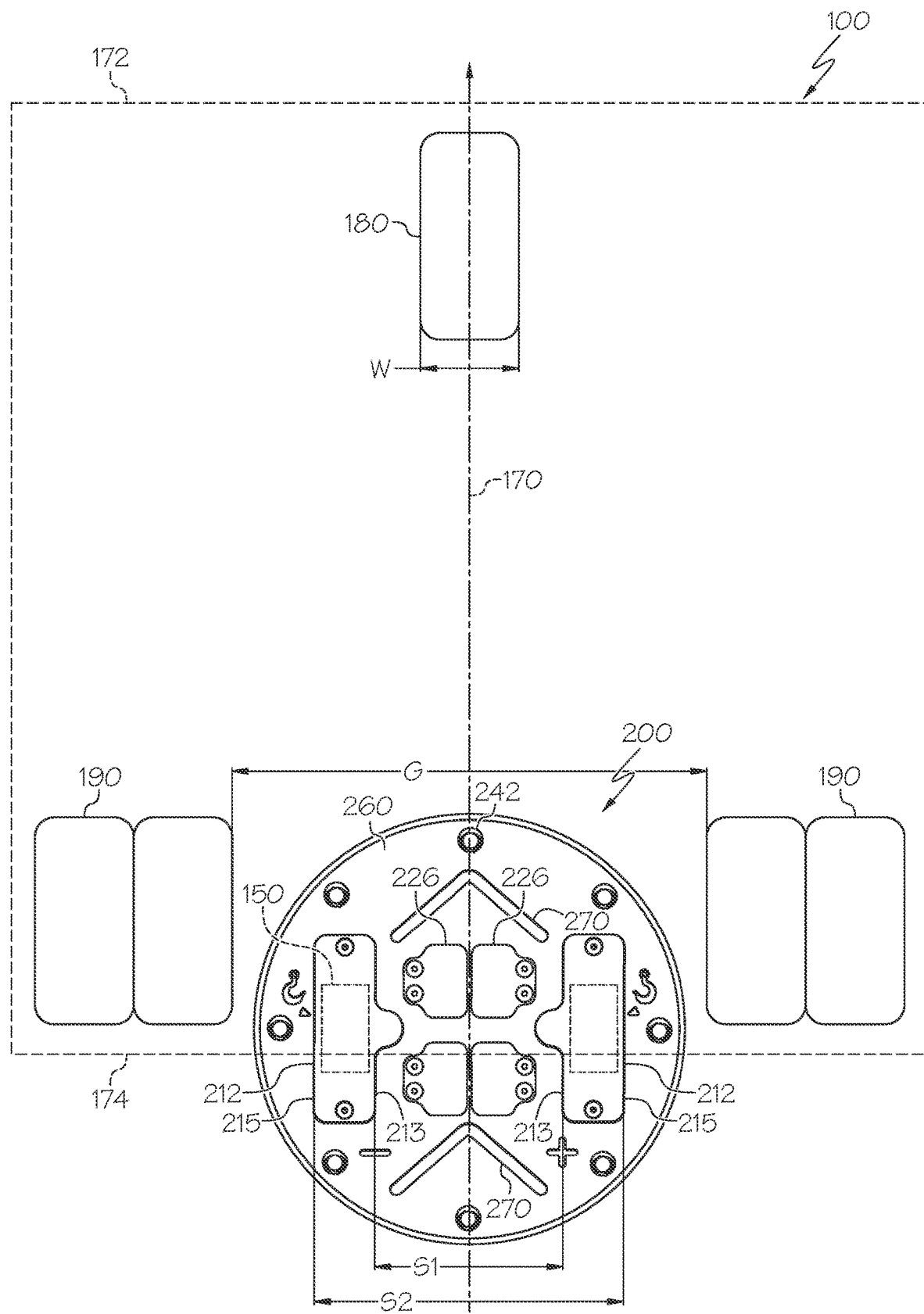
FIG. 4 schematically depicts the materials handling vehicle charging system according to one or more embodiments shown and described herein.

Referring particularly to FIG. 4, the steerable drive wheel 180 may be aligned with the central drive line 170, such that the steerable drive wheel 180 is positioned on the central drive line 170. The steerable drive wheel 180 may define a drive wheel track width W. The drive wheel track width W is at least about 40 mm. In one embodiment, the drive wheel track width W is about 75 mm but may vary depending on vehicle type. In many cases, it is contemplated that the drive wheel track width W is from about 40 mm to about 160 mm. The steerable drive wheel 180 may be positioned at the leading end 172 of the materials handling vehicle 100. In embodiments, the steerable drive wheel 180 may be positioned at the trailing end 174 of the materials handling vehicle 100.

The drive mechanism 130, which is illustrated schematically in FIG. 1, is motively coupled to the steerable drive wheel 180 to rotate the drive wheel 180. The drive mechanism 130 may be any known mechanism for effecting movement of a vehicle, such as, for example, a motor. The drive mechanism 130 is coupled to the battery 120 such that electrical current may be provided from the battery 120 to the drive mechanism 130, thereby powering the drive mechanism 130.

Referring again to FIG. 4, the pair of load wheels 190 may be positioned on opposite sides of the central drive line 170. The materials handling vehicle 100 may include any number of load wheels 190, such as, for example, four load wheels. The load wheels 190 may be positioned on opposite sides of the central drive line 170 such that the load wheels 190 on one side of the central drive line 170 may be positioned adjacent one another, and the load wheels 190 on the other side of the central drive line 170 may be positioned adjacent one another. The load wheels 190 may be arranged such that each wheel rotates about a common axis. The pair of load wheels 190 may define a load wheel gap G between the pair of load wheels 190. In other words, the load wheel gap G may be the spacing or distance between the pair of load wheels 190. In embodiments including more than two load wheels 190, the load wheel gap G refers to the distance between the pair of load wheels 190 closest to the central drive line 170.

Figure 3:
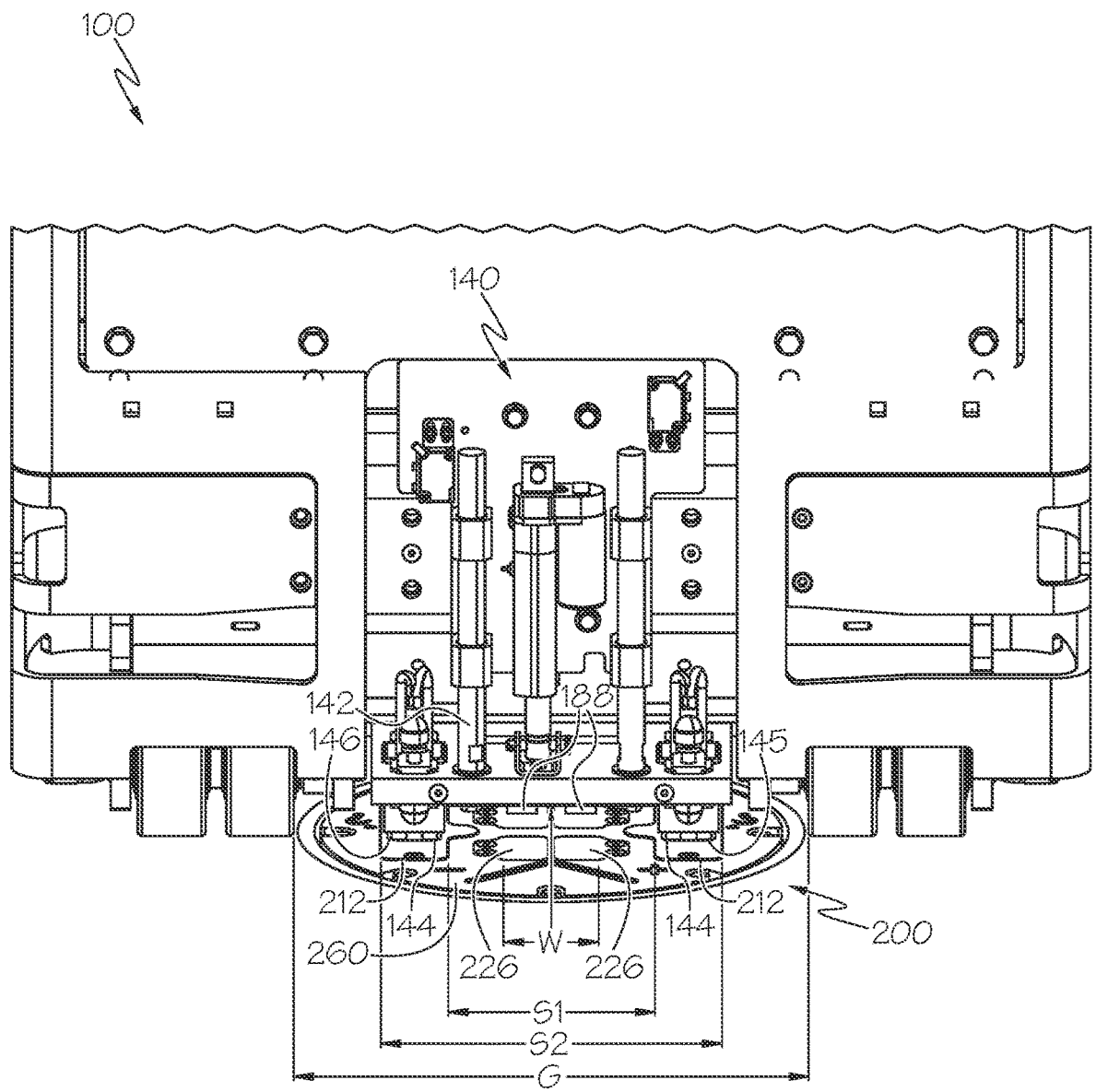
FIG. 3 is an isometric view of the materials handling vehicle charging system according to one or more embodiments shown and described herein.

Referring to FIGS. 3 and 4, the load wheel gap G may be larger than the drive wheel track width W. The load wheel gap G is from about, for example, 300 cm to about 1600 cm, and may particularly be about 500 cm. The pair of load wheels 190 may be positioned at the trailing end 174 of the materials handling vehicle 100, and the steerable drive wheel 180 may be positioned opposite the pair of load wheels 190 at the leading end 172. In embodiments, the pair of load wheels 190 may be positioned at the leading end 172 of the materials handling vehicle 100 with the drive wheel 180 being positioned at the trailing end 174.

As is illustrated with particularity in FIG. 3, the vehicle-side charging contact assembly 140 may include a pair of vehicle-side charging contacts 144 that define the vehicle-side contact profile 150, vehicle-side data transfer contacts 188, and a vehicle-side actuator 142 coupled to the vehicle-side charging contacts 144. The vehicle-side charging contacts 144 may be coupled to the battery 120 via the vehicle-side charging circuitry 160, where the vehicle-side charging contacts 144 are configured to receive an electrical current and transmit the electrical current to the battery 120 via the vehicle-side charging circuitry 160. The vehicle-side actuator 142 may be configured to raise and lower the vehicle-side charging contacts 144 in and out of contact with the charging station 200 to selectively control transfer of electrical current to the battery 120. The vehicle-side charging contact assembly 140 may be positioned at the trailing end 174 of the materials handling vehicle 100. However, in embodiments, the vehicle-side charging contact assembly 140 may be positioned at the leading end 172 of the materials handling vehicle 100. The vehicle-side actuator 142 may lower the vehicle-side charging contacts 144 into contact with a pair of floor-side charging contacts 212 of the floor-mounted charging plate assembly 210, as will be described in more detail herein.

The vehicle-side charging contact assembly 140 may further include vehicle-side data transfer circuitry 192, which is illustrated schematically in FIG. 1, communicatively coupling the vehicle-side data transfer contacts 188 to the charging control unit 184. The vehicle-side data transfer contacts 188 may be positioned between the vehicle-side charging contacts 144. The data transfer contacts 188 are configured to transfer data to and from the charging station 200. The data transferred by the transfer contacts 188 may include battery data, vehicle data, charging station data, or any combination thereof. The data transfer contacts 188 may be coupled to the vehicle-side actuator 142 similarly to the vehicle-side charging contacts 144, so that the data transfer contacts 188 are raised and lowered with the vehicle-side charging contacts 144 in and out of contact with the charging station 200.

Referring again to FIGS. 1-4, the vehicle-side charging circuitry 160 coupling the vehicle-side charging contact assembly 140 to the battery 120 may be a plurality of wires configured to transfer electrical current to and from the vehicle-side charging contact assembly 140 and the battery 120. Specifically, the vehicle-side charging circuitry 160 may be coupled to the vehicle-side charging contacts 144 to transfer electrical current to the battery 120. Additionally, the vehicle-side charging circuitry 160 may be coupled to the vehicle-side actuator 142 to transfer electrical current from the battery 120 to the vehicle-side actuator 142 to actuate the vehicle-side actuator 142, raising and lowering the vehicle-side charging contacts 144.

The materials handling vehicle 100 may further comprise sensors 186, which are merely illustrated schematically in FIG. 1, that are communicatively coupled to the charging control unit 184. The sensors 186 may send signals to the charging control unit 184 indicative of the materials handling vehicle 100, and the vehicle-side charging contacts 144, being properly aligned over the multi-directional charging plate of the charging station 200. The charging control unit 184 may then detect whether the materials handling vehicle 100 and the vehicle-side charging contacts 144 are properly aligned over the multi-directional charging plate of the charging station 200, and, in response, may activate the vehicle-side actuator 142 to initiate charging. The sensors 186 may be proximity sensors, GPS sensors, or the like to determine the positioning of the materials handling vehicle 100. Proximity sensors may include, for example, inductive proximity sensors, capacitive proximity sensors, ultrasonic proximity sensors, or the like.

Referring particularly to FIG. 1, a vehicle control system 112 may be communicatively coupled to the charging control unit 184 and the drive mechanism 130. The vehicle control system 112 may guide the materials handling vehicle 100 by providing signals to the drive mechanism 130, thereby moving and steering the drive wheel 180. The vehicle control system 112 may be communicatively coupled to a master vehicle controller 114 that provides signals to the vehicle control system 112 indicative of locations in which the vehicle control system 112 should guide the vehicle 100. The master vehicle controller 114 may be communicatively coupled to a plurality of materials handling vehicles 100 to coordinate movement of the plurality of materials handling vehicles 100 throughout a warehouse. The vehicle control system 112 may guide the materials handling vehicle 100 for performing tasks, such as moving materials throughout an environment. The charging control unit 184 may provide signals to the vehicle control system 112 indicative of a level of charge in the battery 120 of the materials handling vehicle 100. The vehicle control system 112 may send signals to the master vehicle controller 114 indicative of the level of charge in the battery 120, and the master vehicle controller 114, in response, may send signals to the vehicle control system 112 indicative of a location of a charging station 200. The location of the charging station 200 may be the nearest unoccupied charging station 200. The vehicle control system 112 may then alter the guidance of the materials handling vehicle 100 based on the signals received from the master vehicle controller 114. In response to the signals from the master vehicle controller 114, the vehicle control system 112 may provide signals to the drive mechanism 130 to guide the materials handling vehicle 100 toward the nearest charging station 200.

Referring again to FIGS. 1-4, the charging station 200 may include a floor-mounted charging plate assembly 210, a battery charger 220, and floor-side charging circuitry 230 coupling the floor-mounted charging plate assembly 210 to the battery charger 220. In embodiments, the charging station 200 includes a breaker box 224 coupled between the battery charger 220 and the floor-mounted charging plate assembly 210 such that the breaker box 224 may selectively disconnect electrical current from the battery charger 220 to the floor-mounted charging plate assembly 210. The floor-mounted charging plate assembly 210 may include a pair of floor-side charging contacts 212 defining a floor-side contact profile 214, and a pair of floor-side data transfer contacts 226. The floor-side contact profile 214 may complement the vehicle-side contact profile 150 of the vehicle-side charging contact assembly 140 to enable direct contact transfer of charging current from the floor-side charging contacts 212 to the vehicle-side charging contact assembly 140.

Referring to FIGS. 3 and 4, the pair of floor-side charging contacts 212 define an inner contact spacing S1 and an outer contact spacing S2. The inner contact spacing S1 is the spacing between an inner edge 213 of each of the pair of floor-side charging contacts 212. The inner contact spacing S1 is at least about 15 mm larger than the drive wheel track width W. The inner contact spacing S1 is from about 50 mm to about 400 mm, and may particularly be about 100 mm. The outer contact spacing S2 is the spacing between an outer edge 215 of each of the pair of floor-side charging contacts 212. The outer contact spacing S2 is at least about 70 mm larger than the inner contact spacing S1. The outer contact spacing S2 is from about 120 mm to about 500 mm, and may particularly be about 200 mm. Accordingly, the outer contact spacing S2 is larger than the inner contact spacing S1. Additionally, the load wheel gap G is at least about 20 mm larger than the outer contact spacing.

Figure 2:
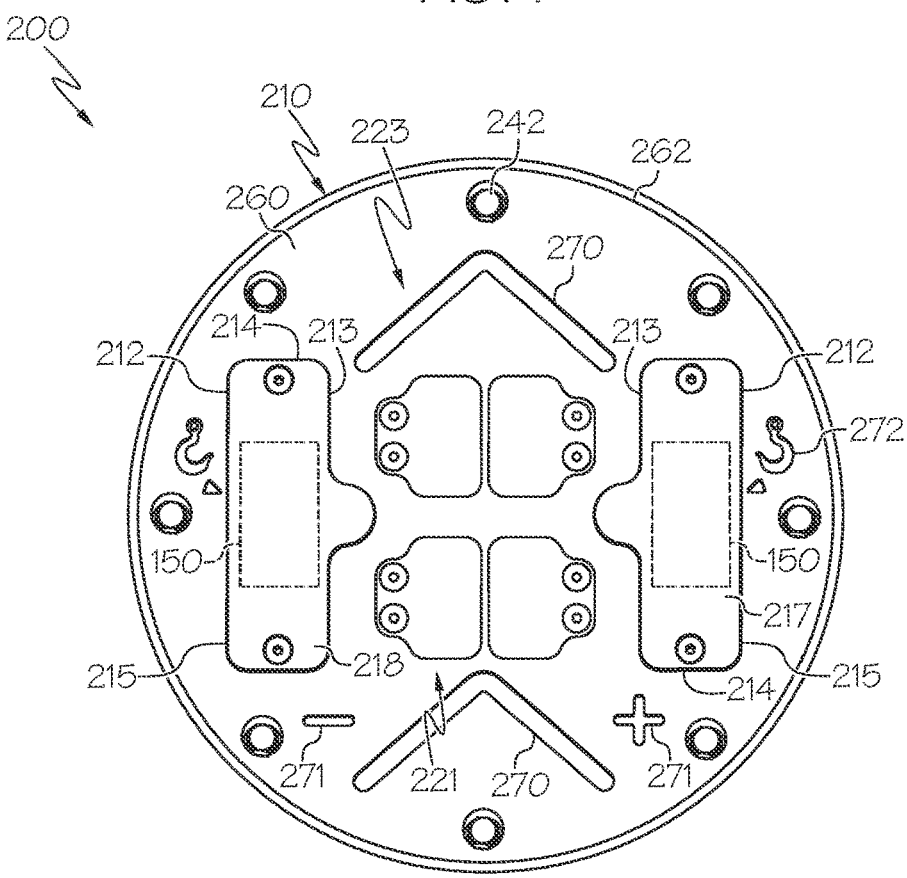
FIG. 2 is a top view of a charging plate of a charging station according to one or more embodiments shown and described herein.

Referring to FIGS. 2-4, the floor-side charging contacts 212 are carried by the multi-directional charging plate 260. The floor-side charging contacts 212 include a positive floor-side contact 217 and a negative floor-side contact 218 spaced apart to be positioned on opposite sides of a floor-side contact gap to define the inner contact spacing S1. The vehicle-side charging contacts 144 include a positive vehicle-side contact 145 and a negative vehicle-side contact 146. The vehicle-side charging contacts 144 are spaced apart a distance such that the vehicle-side contact profile 150 overlaps the floor-side contact profile 214 such that the vehicle-side charging contacts 144 contact the floor-side charging contacts 212 when the vehicle-side charging contacts 144 are lowered by the vehicle-side actuator 142.

The multi-directional charging plate 260 may include a directional indicator 270 oriented in a primary cardinal direction. The positive floor-side contact 217 and the negative floor-side contact 218 lie on opposite sides of a line of travel defined by the central drive line 170 extending in the primary cardinal direction between the positive floor-side contact 217 and the negative floor-side contact 218. As indicated above, the electrical polarity of the vehicle-side charging contacts 144 of the vehicle-side charging contact assembly 140 must match the electrical polarity of the floor-side charging contacts 212 for proper charging. Specifically, the positive floor-side contact 217 must contact the positive vehicle-side contact 145, while the negative floor-side contact 218 contacts the negative vehicle-side contact 146 to provide charging current to the battery 120. As such, the directional indicator 270 may indicate the direction the materials handling vehicle 100 must travel to align the positive vehicle-side contact 145 with the positive floor-side contact 217, and the negative vehicle-side contact 146 with the negative floor-side contact 218. In this manner, charging systems according to the present disclosure can be configured to ensure that vehicles to be charged will approach the charging station 200 from the proper direction, ensuring that the electrical polarity of the contacts of the vehicle-side charging contact assembly 140 will match the electrical polarity of the floor-side charging contacts 212 for proper charging. The multi-directional charging plate 260 may include any number of directional indicators 270, such as, for example, a pair of directional indicators 270. The directional indicators 270 may be positioned on an entry-side 221 of the space between the floor-side charging contacts 212, and the other on the exit side 223 of the space between the floor-side charging contacts 212. Specifically, in embodiments including a pair of directional indicators 270, one may be positioned on the entry-side 221, and the other may be positioned on the exit side 223.

The charging plate 260 may include additional indicators in the form of depressions within the charging plate 260. The charging plate 260 further includes polarity indicators 271, and installation indicators 272. The polarity indicators 271 are configured to indicate the polarity of each of the pair of floor-side charging contacts 212. Specifically, one of the polarity indicators 271 may provide a "+" sign to indicate a positive charge of the floor-side charging contact 212 adjacent to that polarity indicator 271, and the other of the polarity indicators 271 may provide a "−" sign to indicate a negative charge of the floor-side charging contact 212 adjacent to that polarity indicator 271. The installation indicators 272 may be in the shape of a crane hook, and are configured to indicate that a threaded hole for a crane lifting eye is provided adjacent the installation indicators 272. The threaded hole may be provided below the pair of floor-side charging contacts 212.

The pair of floor-side charging contacts 212 may be sized and positioned such that the inner contact spacing S1 is larger than the drive wheel track width W. Similarly, the pair of floor-side charging contacts 212 may be sized and positioned such that the outer contact spacing S2 is smaller than the load wheel gap G. The sizing of the outer contact spacing S2 being smaller than the load wheel gap G permits passage of the steerable drive wheel 180 between the pair of floor-side charging contacts 212, along with passage of the pair of load wheels 190 outside of the pair of floor-side charging contacts 212, with vehicle movement along the central drive line 170.

Referring to FIGS. 1, 3, and 4, the pair of floor-side data transfer contacts 226 are carried by the multi-directional charging plate 260, and may be positioned between the floor-side charging contacts 212. The pair of floor-side data transfer contacts 226 are configured to transfer data to and from the materials handling vehicle 100. The floor-side data transfer contacts 226 are configured to contact the vehicle-side data transfer contacts 188. The vehicle-side data transfer contacts 188 and the floor-side data transfer contacts 226 define complementary contact profiles to facilitate data transfer between the charging station 200 and the materials handling vehicle 100 when the vehicle-side data transfer contacts 188 are in contact with the floor-side data transfer contacts 226. The vehicle-side data transfer contacts 188 transfer data from the materials handling vehicle 100 to the pair of floor-side data transfer contacts 226. The data transferred by the transfer contacts 226 may include battery data, vehicle data, charging station data, or any combination thereof. While the data transfer contacts 226 may be used to transfer data between the charging station 200 and the materials handling vehicle 100, data may be transferred alternatively or in addition to the data transfer contacts through the vehicle control system 112.

Figure 5:
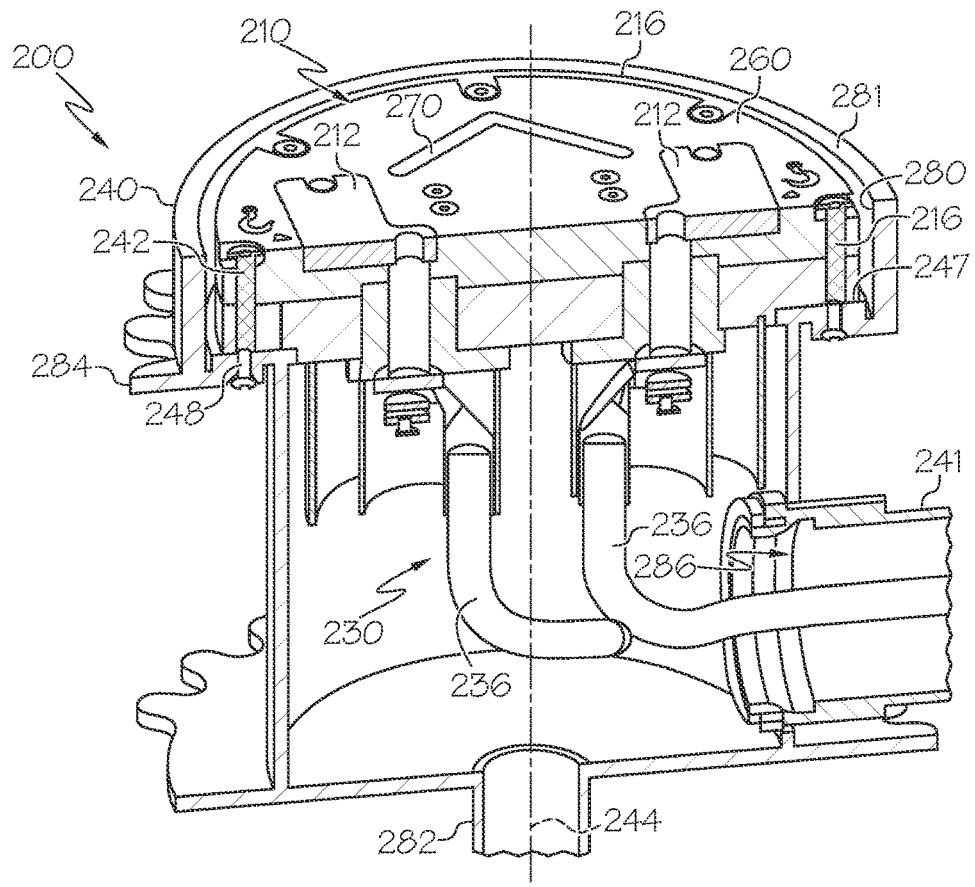
FIG. 5 is a cross-sectional isometric view of the charging station according to one or more embodiments shown and described herein.
Figure 6:
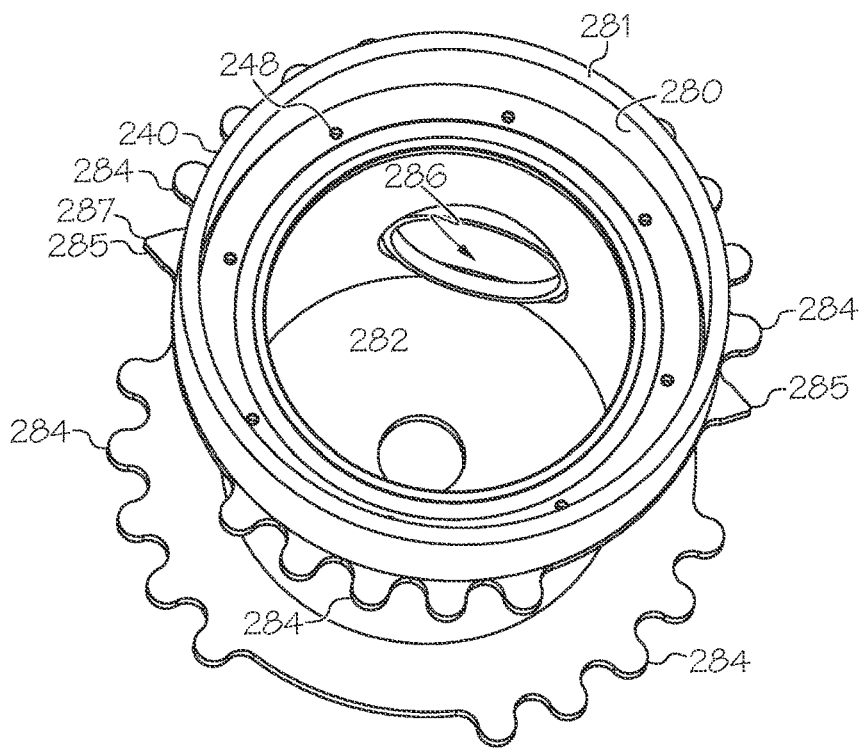
FIG. 6 is an isometric view of a mounting platform of the charging station according to one or more embodiments shown and described herein.

Referring now to FIGS. 5 and 6, the floor-mounted charging plate assembly 210 may include a multi-directional charging plate 260, and a mounting platform 240 configured to receive the charging plate 260. Specifically, the mounting platform 240 may be configured as a can such that the charging plate 260 is received in the mounting platform 240 to form a lid portion of the mounting platform can. The charging plate 260 may be mounted to the mounting platform 240. The multi-directional charging plate 260 carries the floor-side charging contacts 212 and includes a charging plate footprint 262 that is rotationally symmetric at a plurality of mounting positions about a rotational mounting axis 244 orthogonal to a mounting plane defined by a rim 247 of the mounting platform 240. The charging plate footprint 262 may be rotationally symmetric through at least four rotational mounting positions. For example, the multi-directional charging plate 260 may be rectangular or circular with appropriately positioned mounting holes 242 to allow the charging plate 260 to be oriented at different positions. However, the multi-directional charging plate 260 may have any shape, such as triangular, pentagonal, hexagonal, heptagonal, or the like. The charging plate 260 may have a number of positions equal to the number of sides of the charging plate 260.

The floor-mounted charging plate assembly 210 may include mounting hardware 216. The mounting hardware 216 is configured to couple the charging plate 260 to the mounting platform 240. The mounting hardware 216 may be a fastener, such as bolt and nut, rivet, screw, or the like. However, in embodiments, the mounting platform 240 may be coupled to the charging plate 260 via welding, epoxy, adhesive, or the like.

The mounting platform 240 may include a plurality of mounting holes 248 complementary to the mounting holes 242 in the charging plate 260. The plurality of mounting holes 248 and mounting holes 242 may be arranged such that the mounting hardware 216 may be inserted through mounting holes 248 and mounting holes 242. The mounting hardware 216 may be used to secure the multi-directional charging plate 260 to the mounting platform 240 through the complementary mounting holes 248 and mounting holes 242 at a plurality of mounting positions about the rotational mounting axis 244. In this manner, the multi-directional charging plate 260 may be mounted to the mounting platform 240 at a plurality of different rotational positions. The number of rotational positions may be equivalent to the number of mounting holes 242. This allows the installer to position the charging plate 260, and the floor-side charging contacts 212 carried thereby, in an optimal rotational orientation. For example, in cases where the charging station 200 is best approached from one particular direction, the charging plate 260 can be rotationally oriented to ensure proper alignment of the vehicle-side charging contacts 144 of the vehicle-side charging contact assembly 140 with the floor-side charging contacts 212 of the charging station 200. This is particularly desirable in applications where the electrical polarity of the vehicle-side charging contacts 144 of the vehicle-side charging contact assembly 140 must match the electrical polarity of the floor-side charging contacts 212 for proper charging. The aforementioned mounting arrangement also allows the installer to orient the inner contact spacing S1 so that the drive wheel 180 of an approaching materials handling vehicle 100 may conveniently pass between the floor-side charging contacts 212.

The mounting platform 240 may include an upstanding receiving portion 280, a drain pipe 282 opposite the upstanding receiving portion 280, a plurality of peripherally-extending stabilizers 284 extending from a periphery of the mounting platform 240, and a bore 286 extending through the mounting platform 240 in a direction radially outward from the rotational mounting axis 244. The mounting platform 240 is configured to receive the charging plate 260 with the charging plate 260 coplanar with a terminal edge 281 of the upstanding receiving portion 280 of the mounting platform 240. The mounting platform 240 is configured to receive the charging plate 260 such that the charging plate 260 may be mounted to the mounting platform 240 so as to be coplanar with a travel surface of a warehouse floor 300, shown in FIGS. 9-11. Specifically, the mounting platform 240 is configured to be coupled to the warehouse floor 300, with the terminal edge 281 of the upstanding receiving portion 280 being coplanar with the warehouse floor 300.

The bore 286 is configured to receive the floor-side charging circuitry 230 therethrough to connect from the battery charger 220 to the floor-side charging contacts 212, shown schematically in FIG. 1. The drain pipe 282 may extend from the mounting platform 240 parallel to the rotational mounting axis 244. The drain pipe 282 may be in fluid communication with an interior of the mounting platform 240 such that fluid that enters into the mounting platform 240 through either the bore 286 or the upstanding receiving portion 280 may exit the mounting platform 240 through the drain pipe 282.

Figure 7:
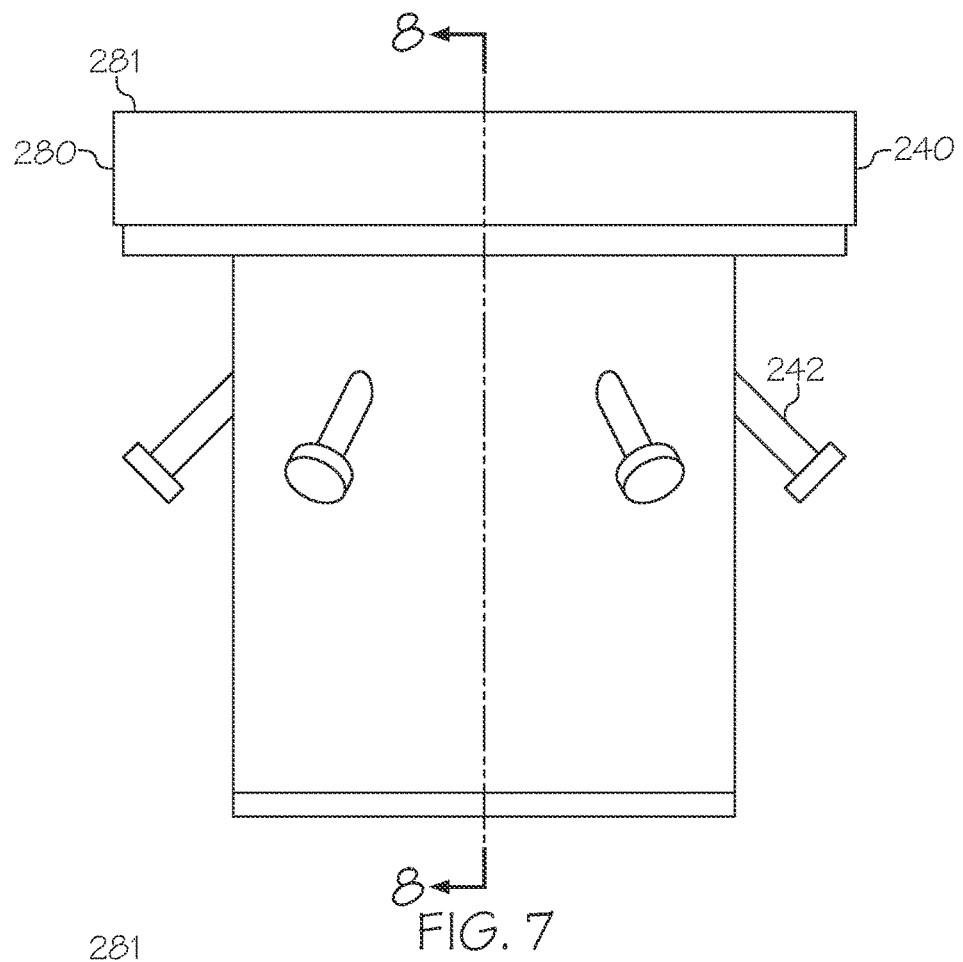
FIG. 7 is a side view of an alternative embodiment of the mounting platform of FIG. 6, according to one or more embodiments shown and described herein.
Figure 8:
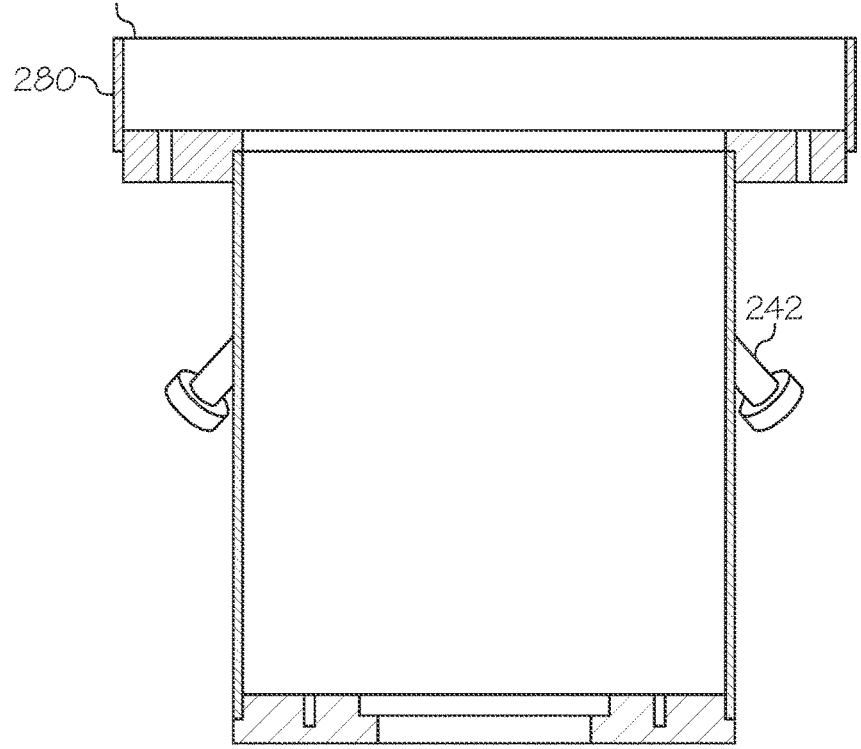
FIG. 8 is a cross-sectional side view of the mounting platform of FIG. 7 taken along line 8-8, according to one or more embodiments shown and described herein.

The plurality of stabilizers 284 may be presented in a variety of forms. For example, and not by way of limitation, the stabilizers 284 may be presented in the form of flanged scallops, as is illustrated in FIGS. 5 and 6, or in the form of angled rods, as is illustrated in FIGS. 7 and 8. In embodiments where the stabilizers 284 are flanged scallops, the plurality of stabilizers 284 extend radially outward from the rotational mounting axis 244 and may be circular, including rounded surfaces. In embodiments where the stabilizers 284 are angled rods, the plurality of stabilizers 284 include a rod extending obliquely from the mounting platform 240, and a head coupled to the rod opposite the mounting platform 240. The head may be circular in shape. However, in embodiments, the head may include any shape.

In any case, the stabilizers should be designed to enhance the degree to which the mounting platform 240, and the rest of the floor-mounted charging plate assembly 210, can be embedded in a warehouse floor with the use of concrete, or other similar materials. The plurality of stabilizers 284 may increase the surface area which the mounting platform 240 contacts the material in which it is embedded. The increased surface area increases the stability of the mounting platform 240 within the embedded material. In other words, the plurality of stabilizers 284 grip the material in which it is embedded to stabilize the mounting platform 240 when exposed to external forces, such as a force from a vehicle positioned on the charging plate 260. Further, the plurality of stabilizers 284 may include an indicating stabilizer 285 that is visually distinct from a remaining plurality of stabilizers 284, as shown in FIG. 6. The visually distinct stabilizer 285 may be triangular, including a front edge 287. The front edge 287 is configured to indicate a direction in which the mounting platform 240 is oriented during installation. As the charging plate 260 must be oriented relative to the direction of which the materials handling vehicle 100 is traveling, it is desirable to provide an indicator during installation to orient the charging plate 260. In the illustrated embodiment, a pair of visually distinct stabilizers 285 are provided on opposite sides of the mounting platform 240. These visually distinct stabilizers 285 can be used to orient the plurality of mounting holes 242 in the mounting platform 240 properly, to help ensure that the charging plate 260 can be oriented properly when it is secured to the mounting platform 240.

Referring again to FIGS. 5 and 6, the charging station 200 may include a conduit 241 extending from the mounting platform 240, and charging conductors 236 extending from the floor-side charging contacts 212, through the mounting platform 240 and the conduit 241, to the floor-side charging circuitry 230 of the charging station 200.

Referring to FIGS. 1 and 5, the charging conductors 236 may be coupled to the floor-side charging contacts 212 to provide electrical current to the floor-side charging contacts 212. The charging conductors 236 may be coupled to the floor-side charging contacts 212 such that one of the floor-side charging contacts 212 may be a positive charging contact and the other of the floor-side charging contacts 212 may be a negative charging contact. The charging conductors 236 may be coupled to the battery charger 220 at an end opposite the floor-side charging contacts 212 such that electrical current may pass from the battery charger 220 through the charging conductors 236, and the charging conductors 236 may transfer electrical current from the battery charger 220 to the floor-side charging contacts 212. The charging conductors 236 may additionally transfer data from the data transfer contacts 226 to the battery charger 220. The battery charger 220 may be communicatively coupled to the master vehicle controller 114 such that the battery charger 220 may transfer the data from the data transfer contacts 226 to the master vehicle controller 114.

Figure 9:
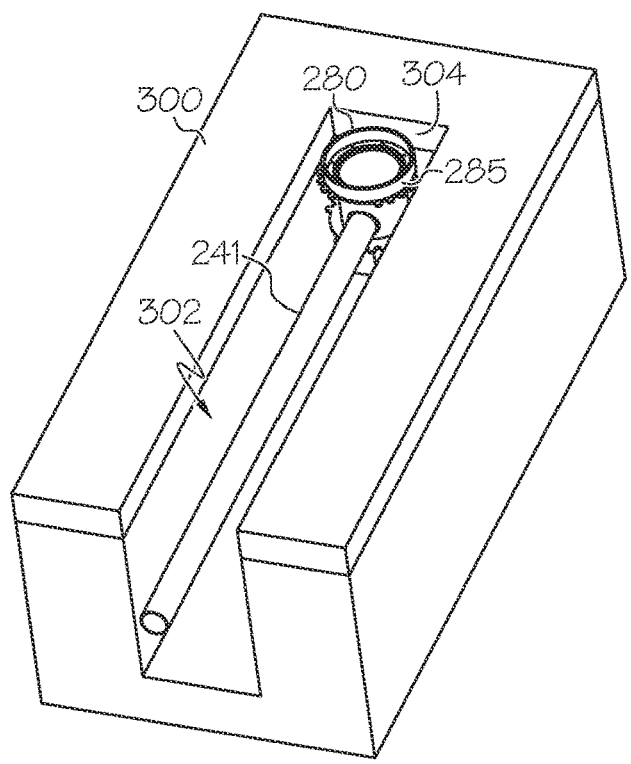
FIGS. 9 and 10 illustrate installation steps for a charging station according to one or more embodiments shown and described herein.
Figure 10:
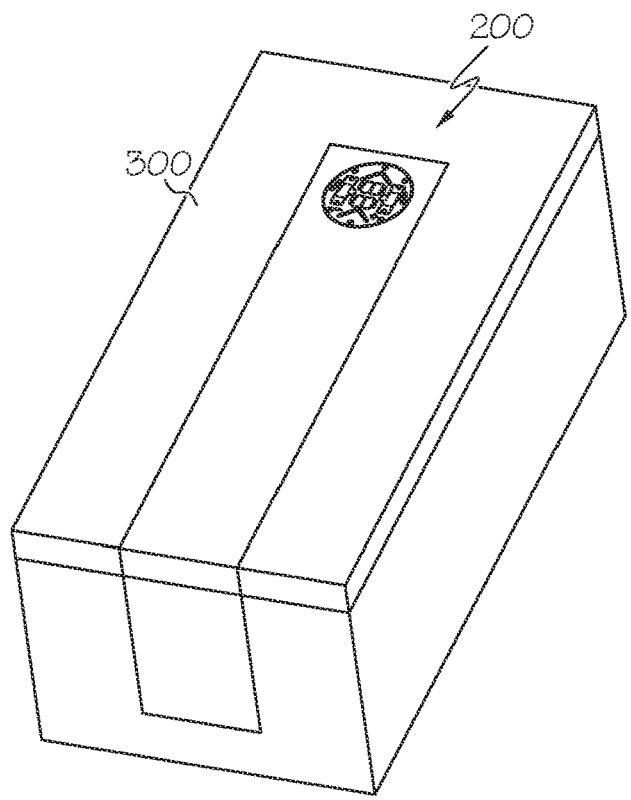
Figure 11:
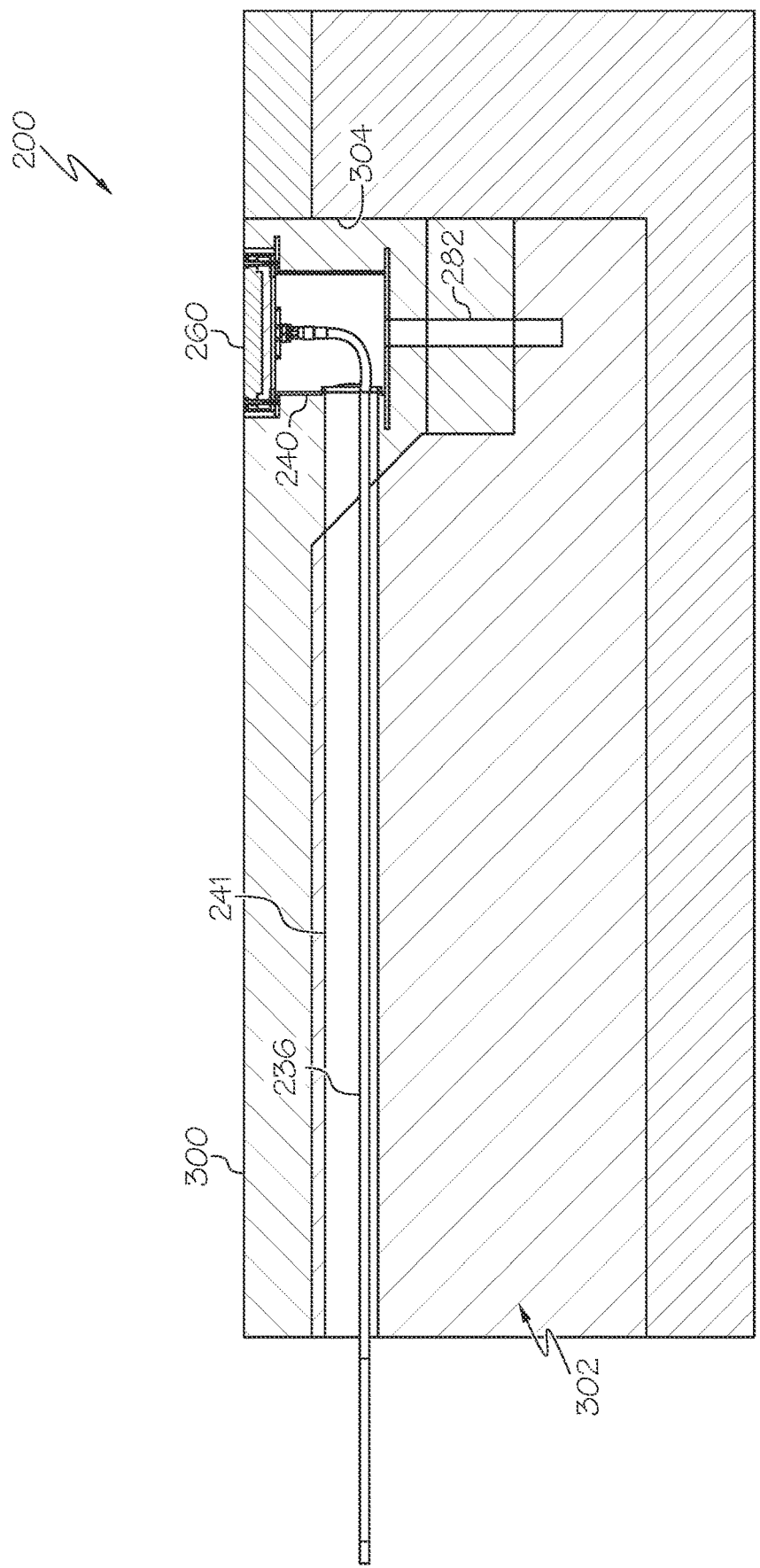
FIG. 11 is a cross-sectional side view of a charging station installed within a warehouse floor, according to one or more embodiments shown and described herein.

Referring now to FIGS. 9-11, the installation of the charging station 200 will now be described. A trench 302 may be formed in a warehouse floor 300 by removing part of the warehouse floor 300. The warehouse floor 300 may be made of, for example, concrete. The mounting platform 240 and conduit 241 may then be positioned within the trench 302. The mounting platform 240 may be positioned at an end 304 of the trench 302 with the drain pipe 282 extending downward from the mounting platform 240 away from the warehouse floor 300. The mounting platform 240 may be oriented using the visually distinct stabilizer 285 to position the mounting platform 240 relative to, for example, a path of travel of the materials handling vehicle 100. The conduit 241 may be positioned such that the conduit 241 extends along the trench 302 from the mounting platform 240. The charging conductors 236 of the floor-side charging circuitry 230 may be routed through the conduit 241 to extend into the mounting platform 240. The trench 302 may be filled with filler material, such as, for example, gravel to extend around the mounting platform 240 and the conduit 241. The filler material allows for drainage of fluids that may flow around or through the mounting platform 240. The drain pipe 282 may extend into the filler material to direct fluid out of the mounting platform 240 and away from the conduit 241. The warehouse floor 300 may then be replaced on top of the filler material.

Once the mounting platform 240 is positioned in the trench 302, the charging conductors 236 extending into the mounting platform 240 may be coupled to the floor-side charging contacts 212. The charging plate 260 may then be coupled to the mounting platform 240. The charging plate 260 may be oriented relative to the mounting platform 240 in one of the plurality of rotational positions by aligning the mounting holes 242 on the charging plate 260 with the mounting holes 248 on the mounting platform 240. The charging plate 260 may then be fixed to the mounting platform 240 via the mounting hardware 216.

For the purposes of defining and describing the concepts and scope of the present disclosure, it is noted that a "warehouse" encompasses any indoor or outdoor industrial facility in which materials handling vehicles transport goods including, but not limited to, indoor or outdoor industrial facilities that are intended primarily for the storage of goods, such as those where multi-level racks are arranged in aisles, and manufacturing facilities where goods are transported about the facility by materials handling vehicles for use in one or more manufacturing processes.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A materials handling vehicle charging system comprising a materials handling vehicle and a charging station, wherein:
    the materials handling vehicle comprises a materials handling mechanism, a battery, a drive mechanism powered by the battery, a vehicle-side charging contact assembly defining a vehicle-side contact profile, vehicle-side charging circuitry coupling the vehicle-side charging contact assembly to the battery, a central drive line extending between a leading end and a trailing end of the materials handling vehicle, a steerable drive wheel motively coupled to the drive mechanism, and a pair of load wheels positioned on opposite sides of the central drive line;
    the steerable drive wheel is aligned with the central drive line and defines a drive wheel track width W;
    the pair of load wheels are positioned on opposite sides of the central drive line and define a load wheel gap G between the pair of load wheels that is larger than the drive wheel track width W;
    the charging station comprises a floor-mounted charging plate assembly, a battery charger, and floor-side charging circuitry coupling the floor-mounted charging plate assembly to the battery charger;
    the floor-mounted charging plate assembly comprises a pair of floor-side charging contacts defining a floor-side contact profile that complements the vehicle-side contact profile of the vehicle-side charging contact assembly to enable direct contact transfer of charging current from the floor-side charging contacts to the vehicle-side charging contact assembly; and
    the pair of floor-side charging contacts define an inner contact spacing S1 that is larger than the drive wheel track width W, and an outer contact spacing S2 that is larger than the inner contact spacing S1 and smaller than the load wheel gap G to permit passage of the steerable drive wheel between the pair of floor-side charging contacts, followed by passage of the pair of load wheels outside of the pair of floor-side charging contacts, with vehicle movement along the central drive line.

2. The materials handling vehicle charging system of claim 1, wherein:
    the floor-mounted charging plate assembly comprises a mounting platform and a multi-directional charging plate mounted to the mounting platform; and
    the multi-directional charging plate carries the floor-side charging contacts and comprise s a charging plate footprint that is rotationally symmetric at a plurality of mounting positions about a rotational mounting axis orthogonal to a mounting plane defined by the mounting platform.

3. The materials handling vehicle charging system of claim 2, wherein the charging plate footprint is rotationally symmetric through at least four rotational mounting positions.

4. The materials handling vehicle charging system of claim 2, wherein:
the floor-mounted charging plate assembly comprises mounting hardware; and
the mounting platform and the multi-directional charging plate comprise a plurality of complementary mounting holes arranged such that the mounting hardware can be used to secure the multi-directional charging plate to the mounting platform through the complementary mounting holes at the plurality of mounting positions about the rotational mounting axis.

5. The materials handling vehicle charging system of claim 1, wherein:
the floor-mounted charging plate assembly comprises a mounting platform and a multi-directional charging plate mounted to the mounting platform;
the floor-side charging contacts are carried by the multi-directional charging plate and comprise a positive floor-side contact and a negative floor-side contact spaced apart to define the inner contact spacing S1;
the multi-directional charging plate comprises a directional indicator oriented in a primary cardinal direction, and the positive floor-side contact and the negative floor-side contact lie on opposite sides of a line of travel extending in the primary cardinal direction between the positive floor-side contact and the negative floor-side contact.

6. The materials handling vehicle charging system of claim 5, wherein the multi-directional charging plate comprises a pair of directional indicators, with one on an entry-side of a space between the floor-side charging contacts, and the other on an exit side of the space between the floor-side charging contacts.

7. The materials handling vehicle charging system of claim 1, wherein:
the inner contact spacing S1 is from about 50 mm to about 400 mm;
the outer contact spacing S2 is from about 120 mm to about 500 mm;
the drive wheel track width W is from about 40 mm to about 160 mm; and
the load wheel gap G is from about 300 cm to about 1600 cm.

8. The materials handling vehicle charging system of claim 1, wherein:
the drive wheel track width W is at least about 40 mm;
the inner contact spacing S1 is at least about 15 mm larger than the drive wheel track width W;
the outer contact spacing S2 is at least about 70 mm larger than the inner contact spacing S1; and
the load wheel gap G is at least about 20 mm larger than the outer contact spacing S2.

9. The materials handling vehicle charging system of claim 1, wherein the floor-mounted charging plate assembly comprises a mounting platform that is configured to receive a charging plate.

10. The materials handling vehicle charging system of claim 9, wherein the mounting platform is configured as a can and the charging plate forms a lid portion of the mounting platform can.

11. The materials handling vehicle charging system of claim 10, wherein the charging station comprises conduit extending from the mounting platform can, and charging conductors extending from the floor-side charging contacts, through the mounting platform can and the conduit, to floor-side charging circuitry of the charging station.

12. The materials handling vehicle charging system of claim 9, wherein:
the mounting platform comprises an upstanding receiving portion; and
the mounting platform is configured to receive the charging plate with the charging plate coplanar with a terminal edge of the upstanding receiving portion of the mounting platform.

13. The materials handling vehicle charging system of claim 9, wherein the mounting platform is configured to receive the charging plate such that the charging plate can be mounted to the mounting platform so as to be coplanar with a travel surface of a warehouse floor.

14. The materials handling vehicle charging system of claim 9, wherein the mounting platform comprises a plurality of peripherally-extending stabilizers.

15. The materials handling vehicle charging system of claim 14, wherein:
the floor-mounted charging plate assembly comprises mounting hardware;
the mounting platform and the charging plate comprise a plurality of complementary mounting holes arranged such that the mounting hardware can be used to secure the charging plate to the mounting platform through the complementary mounting holes;
the peripherally-extending stabilizers comprise a stabiliser that is visually distinct from a remaining plurality of the stabilizers.

16. The materials handling vehicle charging system of claim 1, wherein:
the steerable drive wheel is positioned at the leading end of the materials handling vehicle;
the pair of load wheels are positioned at the trailing end of the materials handling vehicle; and
the vehicle-side charging contact assembly is positioned at the trailing end of the materials handling vehicle.

17. The materials handling vehicle charging system of claim 16, wherein the materials handling vehicle is a tugger configured to pull a load from the trailing end of the materials handling vehicle.

18. The materials handling vehicle charging system of claim 1, wherein the vehicle-side charging contact assembly is positioned at the trailing end of the materials handling vehicle and comprises a vehicle-side actuator that is configured to lower vehicle-side charging contacts into contact with the pair of floor-side charging contacts of the floor-mounted charging plate assembly.

19. The materials handling vehicle charging system of claim 1, wherein:
the materials handling vehicle further comprises vehicle-side data transfer contacts and vehicle-side data transfer circuitry; and
the floor-mounted charging plate assembly further comprises floor-side data transfer contacts positioned between the floor-side charging contacts; and
the vehicle-side data transfer contacts and the floor-side data transfer contact define complementary contact profiles to facilitate data transfer between the charging station and the materials handling vehicle.

20. A materials handling vehicle charging station comprising a floor-mounted charging plate assembly, a battery charger, and floor-side charging circuitry coupling the floor-mounted charging plate assembly to the battery charger, wherein:

the floor-mounted charging plate assembly comprises a pair of floor-side charging contacts defining a floor-side contact profile that is configured to complement a vehicle-side contact profile of a target materials handling vehicle, to enable direct contact transfer of charging current from the floor-side charging contacts to a vehicle-side charging contact assembly; and the pair of floor-side charging contacts define an inner contact spacing S1 that is larger than a drive wheel track width W of the target materials handling vehicle, and an outer contact spacing S2 that is larger than the inner contact spacing S1 and smaller than a load wheel gap G of the target materials handling vehicle, to permit passage of a steerable drive wheel of the target materials handling vehicle between the pair of floor-side charging contacts, followed by passage of a pair of load wheels of the target materials handling vehicle outside of the pair of floor-side charging contacts.

* * * * *